(12) United States Patent
Bahr

(10) Patent No.: US 8,419,903 B2
(45) Date of Patent: Apr. 16, 2013

(54) METHOD FOR CONTROLLING AND COOLING A DISTILLATION COLUMN

(76) Inventor: Frank Bahr, Langenfeld (DE)

( * ) Notice: Subject to any disclaimer, the term of this patent is extended or adjusted under 35 U.S.C. 154(b) by 527 days.

(21) Appl. No.: 12/669,096

(22) PCT Filed: Jul. 12, 2008

(86) PCT No.: PCT/EP2008/005713
§ 371 (c)(1),
(2), (4) Date: Jan. 14, 2010

(87) PCT Pub. No.: WO2009/010250
PCT Pub. Date: Jan. 22, 2009

(65) Prior Publication Data
US 2010/0181184 A1   Jul. 22, 2010

(30) Foreign Application Priority Data

Jul. 19, 2007 (DE) .......... 10 2007 033 540
Aug. 17, 2007 (DE) .......... 10 2007 038 918
Aug. 17, 2007 (DE) .......... 10 2007 038 919

(51) Int. Cl.
*B01D 3/42* (2006.01)
(52) U.S. Cl.
USPC .......... 203/2; 203/1; 203/11; 203/89; 203/91; 203/100
(58) Field of Classification Search .......... 203/1–3, 203/14, 71, 88, 91, 100, 11
See application file for complete search history.

(56) References Cited

U.S. PATENT DOCUMENTS

| 3,255,256 A | * | 6/1966 | Miller .......... 568/922 |
| 3,840,437 A | | 10/1974 | Awan et al. |
| 3,855,074 A | | 12/1974 | Mosler et al. |
| 4,182,657 A | * | 1/1980 | Swindell .......... 203/2 |
| 4,894,145 A | | 1/1990 | Jensen |
| 6,117,275 A | | 9/2000 | Baumann |

FOREIGN PATENT DOCUMENTS

DE  31 27 836 A1  2/1983
GB  1 049 240 A  11/1966

OTHER PUBLICATIONS

"Chemical Engineering Handbook", Perry et al, 6$^{th}$ ed., chapter 13, figure 13-9, p. 13-10 as well as rest chapter 13.*
International Search Report corresponding to international patent application No. PCT/EP200/005713, dated Mar. 5, 2009, 3 pages.

* cited by examiner

*Primary Examiner* — Duane Smith
*Assistant Examiner* — Thomas McKenzie
(74) *Attorney, Agent, or Firm* — Maier & Maier, PLLC

(57) ABSTRACT

The invention relates to a method for controlling, manually or automatically, the composition or quality of one or more products removed from the head, the sump or a lateral removal point of the distillation column having a built-in heat-exchanger. The method is characterized in that, by changing the pressure in the column, in the region of the product removal, the new boiling temperature of the product is determined from the vapor pressure curve of the product at said pressure and the temperature of the distillation removal is adjusted to said new boiling temperature by means of the modified coolant flowing through the heat-exchanger, preferably in the counter direction.

12 Claims, 5 Drawing Sheets

METHOD FOR CONTROLLING AND COOLING A DISTILLATION COLUMN

RELATED APPLICATIONS

This application claims priority, under 35 U.S.C. §119, to German patent application Nos.: 10 2007 033 540.9, filed Jul. 19, 2007, 10 2007 038 918.5, filed Aug. 17, 2007 and 10 2007 038 919.3, filed Aug. 17, 2007, the disclosures of which are incorporated by reference herein their entireties.

The invention relates to a method for manually or automatically controlling the composition and/or quality of one or more products withdrawn from the top, bottom or side offtake of a distillation column with a built-in heat exchanger. The method serves for heat recovery by surface heat exchange.

BACKGROUND ART

In practice, the reduced pressure at the top of the distillation column may change on a short-term basis for a variety of reasons, e.g., due to a disturbance in the top condenser, due to variations in the performance of the vacuum pump, or due to a change in the composition of raw materials when the raw material supply is changed, etc. In this case, the concentrations at the top and at the side offtake, which is optionally present, will change, and the predefined specifications of these products are no longer achieved.

The prior art uses a rigid distillate mass control and a variable reflux control (the setpoint being the distillate withdrawal rate), or a rigid reflux and variable distillate mass control (the setpoint being the reflux rate). This control only responds to the distillate yield at the column head and distributes the mass flows. There is only insufficient response to the thermodynamically caused mass shifts. Boiling point shifts resulting from changes in vacuum lead to changes of the mass flow within the distillation columns. Without manual interference, changes in concentration arise that are represented by means of process analytics. The setpoint concentration is reached again by manual changes of operational parameters.

In addition, the prior art uses a bottom temperature control. Only after an extended transition time, which may last for up to 5 hours, a new steady state condition is reached in which the overhead product or the side product again has the required specifications. The overhead product then no longer has the too low concentration as during the transition period, and also the side offtake no longer contains fractions of the component intended for the overhead product.

The control of a distillation column by adjusting the reflux ratio at the top as a function of the temperature measured at the top is known. In this method, the reflux ratio is adjusted to one of two preset values as a function of a measured temperature difference of two thermometers (German Auslegeschrift DE 1 059 410 of Jun. 18, 1959, Farbenfabriken Bayer AG). Thus, the controlling is effected as a function of the temperature difference of two thermometers disposed at the top end of the column at a vertical distance rather than as a function of the pressure at the column head. In addition, the reflux ratio is set only in two discrete steps rather than continuously.

Heat exchangers within the head of distillation columns for cooling are known from the prior art, for example, from the German Offenlegungsschriften DE 34 16 519 A1, DE 34 36 021 A1, DE 35 05 590 A1 and DE 35 10 097 A1 (Linde AG, 1984 to 1986).

Also known is a method for distilling/rectifying, preferably oleochemical mixtures, especially mixtures of fatty alcohols, in a column comprising a head and a bottom with or without built-in features such as structured or unstructured packings, packing bodies or trays or the like with a specified pressure loss for predefined liquid and vapor loads of the column.

Such a method is described in the article "Die destillative Aufarbeitung oleoche-mischer Stoffe" by Johannisbauer, Peukert, Skrobek, Henkel-Referate 33/1997, pp. 14-21, issued by the Henkel KGaA, Düsseldorf, 1997. It includes a survey of the state of the practical use of distillation and rectification apparatus in the oleochemical industry at that time, a survey that is still valid on the whole.

What is important in the distillative processing of oleochemical substances is the use of as low temperatures as possible, since such substances have a particularly high thermal sensitivity. Therefore, as low as possible a pressure loss over the column's built-in features is also usually sought, since an increased pressure loss requires high bottom temperatures. Therefore, just in the distillation and rectification of oleochemical substances, regular column packings with their low pressure loss per separation stage are employed.

The technical design of rectification columns is determined by two objects: on the one hand, that as many separation stages as possible are to be realized, and on the other, that the pressure loss and thus the bottom temperatures are to be as low as possible.

The number of separation stages and the pressure loss per column height are usually dependent on the liquid load and, even more, on the vapor load on the columns. As a measure of the vapor load, the "comparable air velocity" has been introduced. It takes the influence of the vapor density on the pressure loss as demanded by the Bernoulli equation into account and, in addition, is clearer than the F factor used in the English-speaking literature.

About 20 years ago, most columns of the oleochemical industry were still equipped with ceramic packing bodies or bubble caps, which at best reached 1 separation stage/m of height and a pressure loss of 5 mbar/m of height for a comparable air velocity of 1.5 m/s. Flat bubble caps and metallic packing bodies already provided a significant improvement, which was utilized essentially to prepare products of higher purity.

Then, the giant leap in rectification technology was achieved in the middle of the 1970's due to the development of the regularly shaped column packings of the company Sulzer. The packings were at first prepared from wire mesh, and later also from thin metal plates. With more than 2 separation stages/m and a pressure loss of <1 mbar/m at a comparable air velocity of 2 m/s, substantially higher throughputs could suddenly be achieved in existing plants, or completely new separation concepts could be realized.

A generally uniform arrangement of the column built-in features, such as bubble caps, packings and the like, is usual in the prior art. Therefore, the pressure also increases in an essentially linear way from column head to column head in accordance with the pressure loss of the built-in features. The modern column built-in features, as described above, have a relatively small pressure loss, so that the pressure in the bottom region is only slightly higher than in the head region. A consequence thereof is an undesirable additional evaporation of high-boiling components, which then also arrive at the distillate to be withdrawn. Another drawback resides in the fact that this fraction of high-boiling components that arrives from the bottom at the region of the column head is cooled down there and, after flowing down to the bottom, again takes up heat, so that this process results in an increased energy consumption.

OBJECT OF THE INVENTION

It is the object of the invention to achieve a very fast settling of the column condition from one steady state condition to a new steady state condition in the method of the kind mentioned above when the pressure in the column head is changed on a short term basis, while the quality of the overhead product is as good as in the previous condition.

Solution According to the Invention

In the method of the kind mentioned above, this object is achieved according to the invention as follows: when the pressure in the column is changed in the region of product withdrawal, then the new boiling temperature of the product at this pressure is determined from the vapor pressure curve of the product, and the temperature of the cooling medium flowing through the heat exchanger is set at this new boiling temperature.

The method is based on the fact that the components of the compositions to be distilled have defined boiling or condensation temperatures at predetermined pressures in accordance with the vapor pressure curves. When the pressure changes in the column, the boiling temperature of the components of the mixture changes as well.

It is known to increase the degree of purity of the distillate by recycling part of the overhead condensate into the column. The recycling at the same time causes cooling in the column head.

According to the invention, vapor/liquid heat exchangers are installed in the distillation column in which heat exchangers the distillation exhaust vapors are cooled by means of a cooling medium in the ascending phase and/or only in the condensation region and upstream from the exhaust vapor tube. The condensation or boiling temperatures are calculated by a distillation controlling means on the basis of the vapor pressure curve of the components, and the cooling medium is set to the condensation/boiling temperature at the prevailing pressure conditions. In this method, the recycling is effected through a reflux manifold into the top condensers and/or is injected into the exhaust vapor tubes of the ascending portion.

In the column inlet, the cooling medium falls short of the condensation temperature of the distillate, which ensures an effective exhaust vapor condensation.

The temperature measurement for the distillation control loop is effected at the first distillate withdrawal above the ascending portion. The measuring sensor controls the flow of cooling medium and thus adjusts the condensation point of the distillate. The cooling medium flows through the ascending portion in countercurrent, which provides for a temperature rise in the bottom direction and thus for a thermal reflux.

In the hottest region of the distillation column, above the bottom, there are the cooling medium outlets (or cooling medium outlet in the drawing). This construction of the cooling medium flow (also in combination with the distillation control loop) enables a highly efficient heat recovery.

Further, it is proposed:
that the method is applied to the distillation of non-azeotropic mixtures, of an alcohol mixture, of propanediol or for the purification of water from industrial water or sea water;
that the heat recovery is effected without condensation point control for the purpose of achieving a desired cooling medium outlet temperature;
that the cooling medium outlet is in the bottom region, or the cooling medium is conducted through the bottom medium; and
that the distillation is performed under an increased pressure, e.g., at 2-3 bar.

The method according to the invention for manually or automatically controlling the composition and/or quality of one or more products withdrawn from the top, bottom or side offtake of a distillation column with a built-in heat exchanger is characterized in that, when the pressure in the column is changed in the region of product withdrawal, then the new boiling temperature of the product at this pressure is determined from the vapor pressure curve of the product, and the temperature is set at this new boiling temperature by changing the flow of the cooling medium.

Thus, it is possible to achieve a very fast settling of the column condition from one steady state condition to a new steady state condition when the pressure in the column head is changed on a short term basis, while the quality of the overhead product is as good as in the previous condition. Further, the cooling enables an efficient heat recovery by the surface heat exchange in connection with the controlled flow of the cooling medium.

When a mixture is distilled or fractionated to obtain a highly concentrated overhead product, a very fast settling of the column condition from one steady state condition to a new steady state condition is to be achieved when the pressure in the column head is changed on a short term basis, while the quality of the overhead product is as good as in the previous condition.

This is achieved by the fact that the control is effected by changing the quantity withdrawn or the reflux as a function of a thermodynamic state variable, that when the pressure in the column is changed in the region of product withdrawal, then the temperature change required therefrom is determined from the vapor pressure curve of the product, the reflux and/or distillate withdrawal rate is changed on a short term basis until the temperature in the column in the region of product withdrawal has reached the new setpoint as determined from the vapor-pressure curve, and thereafter the reflux and/or distillate withdrawal rate is reset to the original value.

In addition, the method is characterized in that, when the composition of the raw materials changes, the control loop will adjust the distillate withdrawal rate accordingly due to the temperature shifts resulting therefrom.

In contrast to the prior art according to the above mentioned German Auslegeschrift DE 1 059 410, the control is here effected, not as a function of a temperature difference, but as a function of the pressure in the column in the region of product withdrawal, e.g., at the column head. Depending on this parameter, the distillate withdrawal rate or the reflux is changed. It is possible thereby to shorten the transition period to less than one hour, especially to as short as 15 to 20 minutes, and to ensure the purity of the distillate by automatization and visualization of changes in boiling point.

Thus, according to the invention, when a change in the pressure in the column occurs, the distillate withdrawal rate or the reflux are changed on a short term basis until the temperature in this region has reached a new value that is determined by the vapor pressure curve at this new pressure.

It is further proposed that the temperature is additionally monitored at a site other than the product withdrawal, and the measured values obtained are also used for control.

Including a second temperature measurement effected below the head temperature measurement, the control of the distillation can be better damped because concentration changes are earlier detectably there. At the same time, recovery improvements can be achieved by setting the temperature value to a distillate concentration to be determined (which can be calculated from the energy content of the mixture due to the different boiling points). However, the critical quantity is not the temperature difference between the two measuring points as in DE 1 059 410.

It is further proposed that during the transition from one steady state condition to the other, any exceeding or falling short of the setpoint temperature as determined from the vapor pressure curve of the product is detected by means of limit monitors, and an optical and/or acoustic signal is emitted.

In the following, the invention will be further illustrated by means of a concrete course of a process. If the vacuum is deteriorated on a short term basis, i.e., the pressure in the column increases, then the boiling point will increase in accordance with the vapor pressure curve for the desired product, e.g., the fatty alcohol with chain length C12. Consequently, less C12 fatty alcohol will evaporate. According to the invention, the distillate withdrawal rate is now increased, and the reflux rate decreased, so that the temperature at the withdrawal site, i.e., at the head, rises until it reaches a value that corresponds to the boiling point at the new pressure value. Thereafter, the distillate withdrawal rate or the reflux rate is reset to the previous value. However, the temperature at the column head remains at the newly set value.

Conversely, if the vacuum improves at the column head, i.e., the pressure decreases, then the boiling point of the product withdrawn at the column head, e.g., the C12 fatty alcohol, also decreases. However, a larger amount of high-boiling components also evaporates now, so that the purity of the product no longer has the desired value. According to the control according to the invention, the distillate withdrawal rate is now throttled, and the reflux rate increased. Thus, the temperature at the column head will decrease. Then, when the temperature has reached the new boiling point at the corresponding reduced pressure as determined from the vapor pressure curve, the distillate withdrawal rate and the reflux rate are reset to the old value, in particular. The product concentration at the column head and thus the purity of the product again have the same value or a similar value as that before the pressure change. The newly set temperature is retained despite the same reflux ratio and the same distillate withdrawal rate. Of course, the reflux ratio changes considerably during vacuum changes and the consequent interferences. However, when the operation is in a steady state condition, it will readjust itself approximately. Exact adjustment is possible only by changing the energy input.

In addition, when oleochemical substances are processed by distillation, energy is to be saved on the one hand, and the selectivity increased on the other. In addition, a lower construction height of the column is to be achieved with the capacity remaining the same.

In another embodiment according to the invention, this is achieved by providing built-in features, such as structured or unstructured packings, packing bodies or trays or the like, with a specified pressure loss for predefined liquid and vapor loads of the column, and providing a throttle element above the bottom, especially below the built-in features of the feed inlet, having such a design that the highest pressure loss will occur at this throttle element.

According to the invention, the pressure is thus substantially higher in a limited region of space above the bottom as compared to the remaining regions of the column, so that significantly less high-boiling components will evaporate from the bottom. In order for the desired amount of middle- and low-boiling components to evaporate despite the increased pressure, only a slight increase of the bottom temperature is required that does not adversely affect the quality of the thermally sensitive oleochemical substances.

Since substantially less high-boiling components evaporate through the throttle element and no longer arrive in the region of the column head, the selectivity of the column is significantly increased, and the energy demand is substantially reduced. In addition, a clearly reduced construction height is possible as compared to conventional columns.

The reduction of the column height serves to shorten the dwelling time for the distillate exhaust vapors within the column in order to prevent the ascending velocity from decreasing. This could lead to condensation of the distillate within the column.

Further, the previous expenditure for the regulation of the energy balance through the reflux rate is necessary only in a limited way, since the low-boiling components no longer need to be separated from the high-boiling ones.

Due to the reduced height of the column, the investment expenditure for the construction decreases. In operational experiments, it could be demonstrated that the energy demand decreases by more than 20% when the process according to the invention is applied.

Further, it is proposed that the pressure loss at the throttle element is higher than the total pressure loss over the remaining built-in features. In other words, it is proposed that the pressure loss in the region of the throttle element is higher than the total pressure loss over the remaining regions of the column.

It is proposed that the feed is supplied laterally between the throttle element and the head or bottom, and that the feed temperature is higher than the boiling temperature of the highest-boiling component of the desired overhead product at a pressure corresponding to the pressure in the feed inlet of the column and lower than the boiling temperature of the lowest-boiling component of the desired bottom product at a pressure corresponding to the pressure in the bottom region.

The lateral supply of the raw material (feed) above the throttle element and at this temperature causes a preliminary separation of the components of the desired overhead product, i.e., the distillate. The remaining liquid fractions meet the built-up liquid and the strongly heated throttle element and evaporate there in the case of components of the desired distillate, or flow downward into the bottom in the case of components of the desired bottom product.

It is further proposed that the feed is directly applied to the throttle element, or it is split and fed above and below the throttle element.

In addition, it is proposed that the bottom temperature is lower than the boiling temperature of the lowest boiling component of the desired bottom product as measured above the throttle element taking the pressure prevailing there into account and higher than the boiling temperature of the highest boiling component of the desired overhead product, each at a pressure corresponding to the pressure in the bottom region.

The intended bottom temperature is selected in such a way that only a minor part or none of the components of the desired bottom product flow in gas form through the throttle element and the liquid built up thereon, thus overcoming it.

It is further proposed that the height of the column is selected or reduced in such a way that the overhead product remains gaseous/vaporous within the column and does not condense within the column.

The method according to the invention is applicable to all distillable homogeneous mixtures of liquids whose boiling points differ by >10° C. each. Examples of such mixtures are, for example, fatty acids, methyl esters, hydrocarbons, vegetable oils, benzenes, alcohols, glycerol, petrochemical base materials and the derivatives of the above mentioned groups of substances, but also inorganic chemicals and sea water and other aqueous solutions.

SURVEY OF THE FIGURES

In the following, Examples of the invention and Comparative Examples are described in more detail by means of drawings, wherein.

In all the drawings, identical reference symbols have the same meanings and therefore are explained only once if used repeatedly.

1ST EXAMPLE

Figure 1:
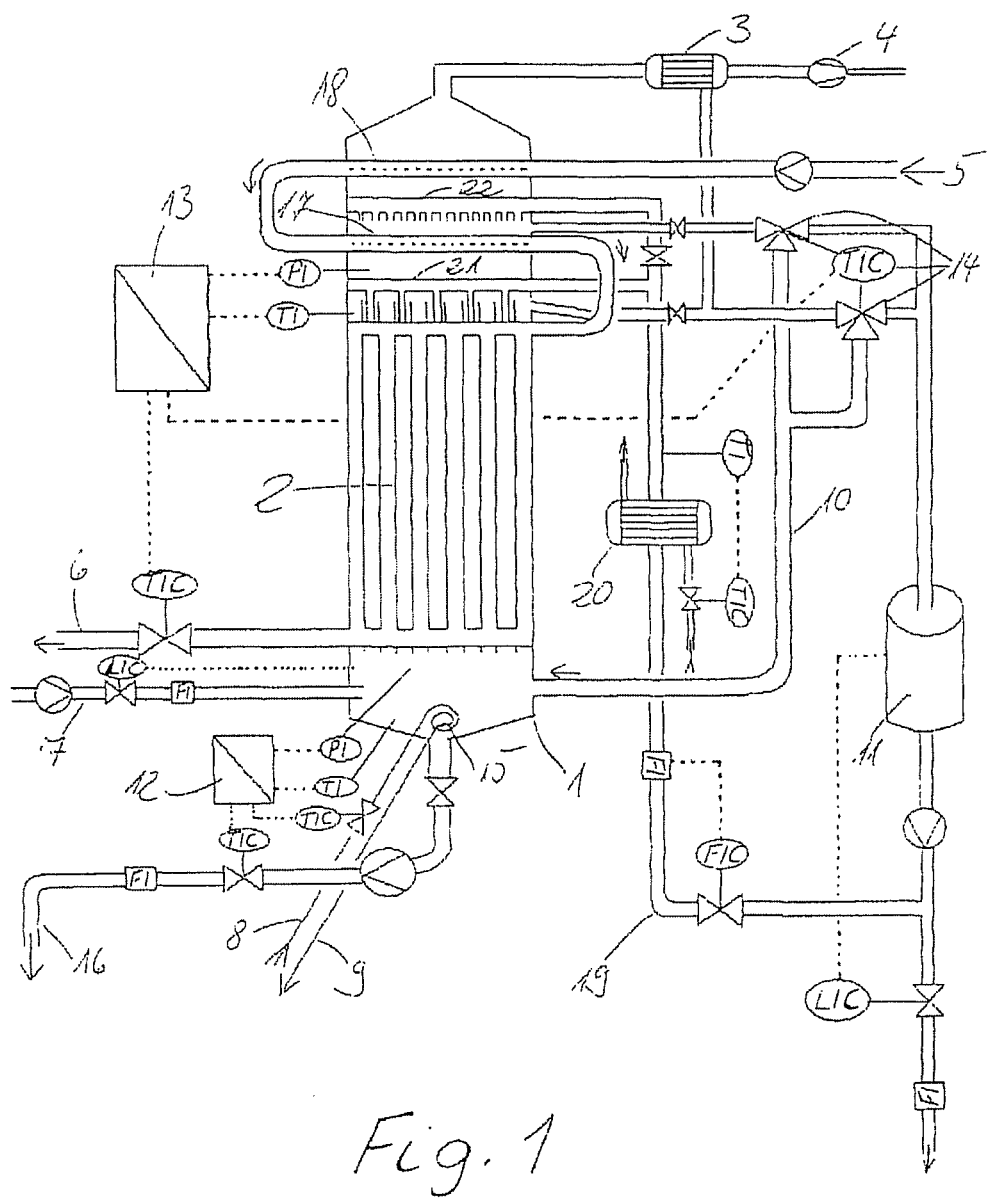
FIG. 1 shows a schematic representation of a first Example of an installation with which the method according to the invention is operated.

FIG. 1 shows a distillation column 1 with a heat exchanger 2, in this case a jacketed heat exchanger (jacketed tubes), filled with fine mesh packings in the exhaust vapor tubes. Alternatively, tube bundle heat exchangers in a flat design may also be employed, wherein the exhaust vapors flow past the cooling coils. In addition, an after-condenser 3 can be seen, connected with a vacuum aggregate 4, and the cooling medium inlet 5 and the cooling medium outlet 6 for the heat exchanger 2. Further shown are the inlet 7 for the feed raw material, the vapor inlet 8 for the bottom heater 15, and the condensate outlet 9 for this bottom heater 15, as well as the distillate recycling conduit 10, wherein the distillate is recirculated to the bottom, and the distillate receiver 11. The vapor supply for the bottom heater is locked against bottom overheating, wherein the control means 12 according to the invention calculates the bottom temperature and thus ensures freedom from distillate content in the bottom. A further control means 13 for the head region of the column is also depicted in FIG. 1; it controls the flow of cooling medium via the calculated boiling temperature of the distillate by control and thus adjusts the condensation point of the distillate. Via the conduit 16, the bottoms can be guided to a downstream distillation column (not shown). Further, the head condensers 17 and 18 are shown. The reflux is applied through the reflux conduit 19 and through the reflux condenser 20 to the reflux manifolds 21 and 22.

The column works as follows: The distillate condensates at the head of the ascending phase condenser 2 and at the head condensers 17 and 18 and flows off. When the temperature deviates, the distillate can be recirculated to the column, for example, through a three-ay valve 14, or guided into the raw material tank (not shown). The recirculation of the raw material is effected by level-control depending on the bottom level of this column. The bottom transfer from this column to a subsequent column again occurs by control by means of control means 12, which also works on the basis of the vapor pressure curves, in order to ensure that there is no more low-boiling component in the bottom medium that would have to be distilled off in the present column. In order to prevent overheating of the bottom medium, the supply of the heating medium, vapor in this case, should also have a temperature control. Alternatively, of course, it is also possible to use the conventional operation mode with a constant feeding amount and a level-controlled bottom output from the column.

For this plant and process design, any number desired of such columns can be connected in series. For example, the last distillation column can have a conventional design with a low difference pressure, since this column serves to achieve as high a yield as possible, which would not be reasonable for the distillation of propanediol, however, for energy reasons.

A wide variety of liquids, gases or also molten salts can serve as a cooling medium for the heat exchangers 18, 17 and 2. Preferably, however, the feed raw material and/or feed water is used as the cooling medium. Molten salts (liquid salt) can be employed for distillations at very high temperatures that no longer enable the production of vapor.

As the heat exchangers, tube bundle heat exchangers, jacketed heat exchangers and screen heat exchangers etc. can be employed. For the head condensation, for example, coil heat exchangers or tube bundle heat exchangers, in which the distillate exhaust vapors flow past the cooling tubes in countercurrent and condense, can be used.

What is also important and advantageous is:

- the condensation point setting of the cooling medium for the desired distillate;
- the control alternatively applied in a reversible mode for control of the exit temperature of the cooling medium;
- the recovery of the energy supplied for the distillation, which is efficiently realized due to the surface heat exchange 2, 17, 18 in combination with the distillation control loop 13, and the withdrawal of cooling medium above the bottom;
- the distillate recirculation conduit 14 for recirculation into the distillation column 1 or into the alternative tank if the specification deviates;
- the control of the bottom output/bottom heating for safeguarding the freedom from distillate content (which is important for fractionations, in particular); and
- the injection of the reflux into the individual exhaust vapor tubes.

2ND EXAMPLE

Figure 2:
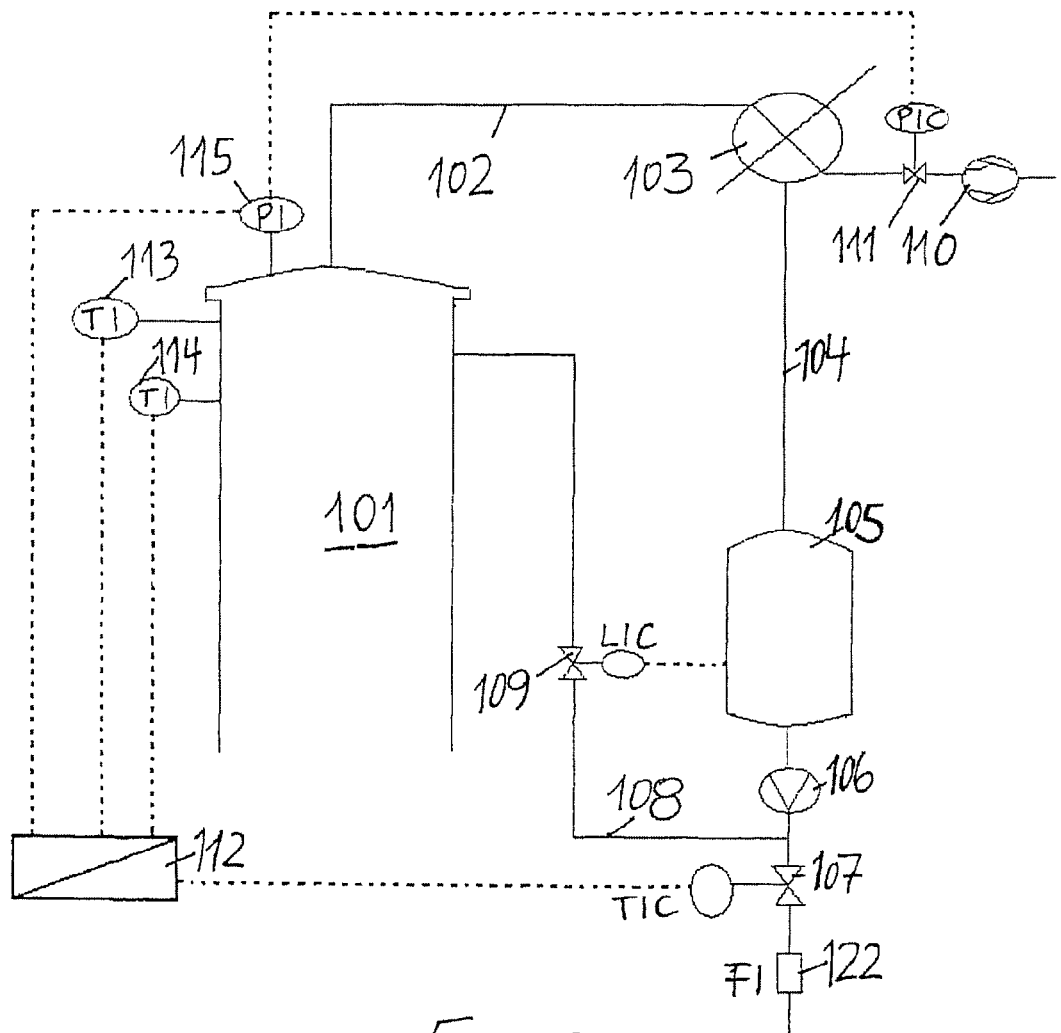
FIG. 2 shows a flow diagram of a distillation plant with the control loop according to the invention with a reflux according to a second Example.

FIG. 2 shows a distillation column 101 in which the overhead product is withdrawn via a conduit 102 and, after condensation in condenser 103, guided via a conduit 104 to the distillate receiver 105. A distillate pump 106 conveys the distillate through a valve 107 and a flow meter 122 to the product outlet. The distillate that is not withdrawn flows through a reflux conduit 108 and a valve controlled by the liquid level in the distillate receiver 105 into the column 101 at the head thereof.

A vacuum aggregate 110 connected with the head condenser 103 through a valve 111 provides for the reduced pressure in the condenser 103 and in the head of the column 101. The valve 111 is controlled by the pressure at the column head.

According to the invention, now, a ratio control with a control means 112 is effected that controls the temperature and pressure in accordance with the boiling point references obtained from the vapor pressure curves. This is a so-called ratio control. This means that the control is based on the ratio of boiling point shifts as a function of the pressure change.

At two temperature measuring points 113, 114, the temperature at the head of the column is monitored, both at the very top of the head and at some distance below, and transmitted to the control means 112. Also, the pressure at the head of the column is monitored by a pressure measuring point 115 and transmitted to the control means 112. From these values, the control means calculates a manipulated variable for the valve 107 based on the vapor pressure curves, which controls the amount of distillate withdrawn and thus indirectly the reflux as well, and thus the reflux ratio. The valve 109, which is controlled by the liquid level in the distillate receiver 105, only serves to maintain a certain liquid level in the distillate receiver, which must never be pumped empty.

Figure 3:
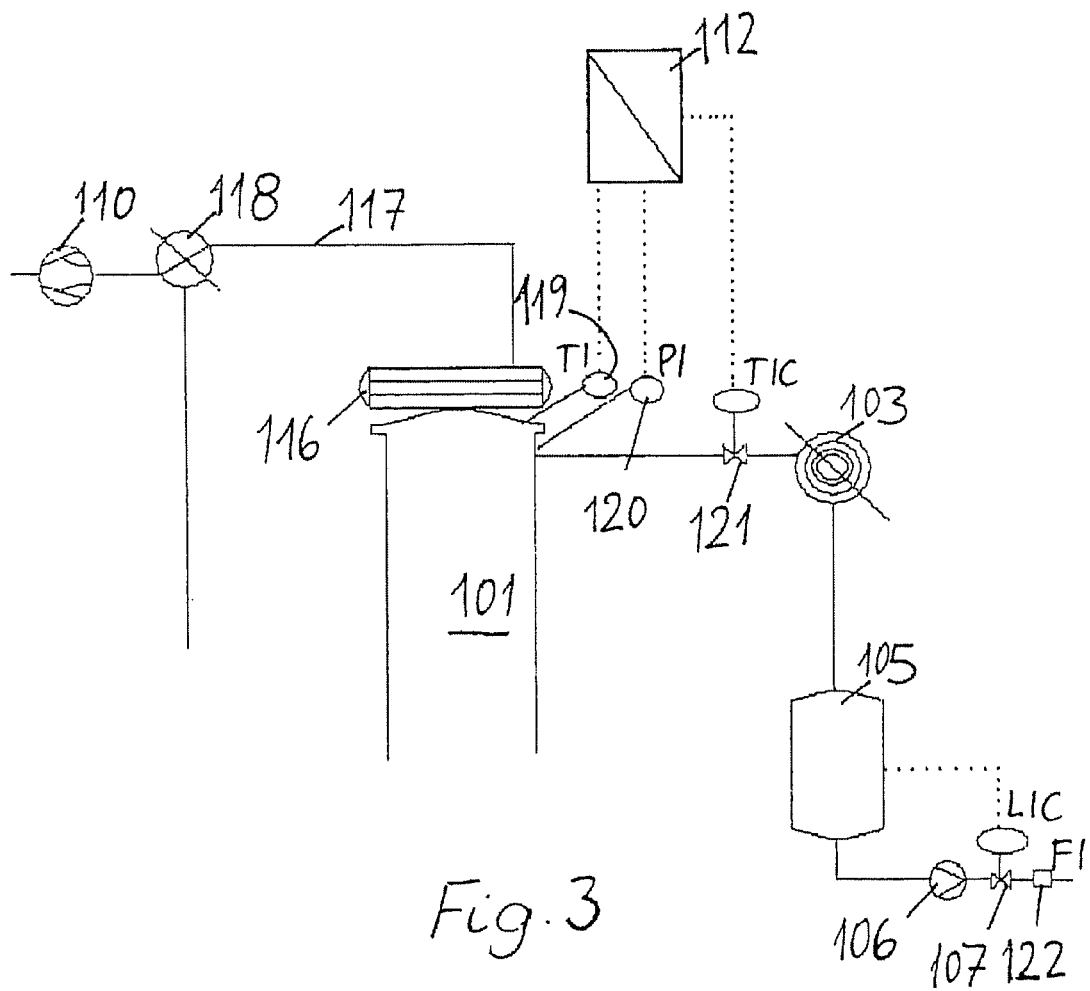
FIG. 3 shows a flow diagram as in FIG. 2, but with a control loop according to the invention without a reflux.

According to the invention, it is also possible to use the control for a column without reflux. An example thereof is shown in FIG. 3. In addition to the means for receiving the distillate according to FIG. 2, a condenser 116 is additionally provided at the head of column 101. The column is designed for the withdrawal of liquid distillate. The exhaust vapors condense on the condenser 116 and directly flow back into the column. The exhaust vapors that have not yet condensed there go through the conduit 117 to the further condenser 118, which is connected with the vacuum aggregate 110. The condensate from the condenser 118 is recirculated to the alternative tank or a collector tank. This means the feed tank from which the raw material is fed into the column.

The measured values from a temperature measuring point 119 and a pressure measuring point 120 at the head of the column are used for calculation by the control means 112 taking the vapor pressure curves of the components of the mixture to be processed into account to yield a manipulated variable with which the valve 121 is actuated. The valve 121 determines the extent of distillate withdrawal. The flow meter 122 monitors the instantaneous flow of distillate.

In the following, experimental results are presented by means of Tables, the experiments having been performed with a plant according to FIG. 2.

Experimental Results from the 2nd Example

The experiments were performed with a distillation column into which a feed, namely a fatty alcohol mixture with chain lengths of from C8 to C16, was fed. At the head, an as pure C8 fatty alcohol as possible was to be obtained. Part of the overhead product was recirculated (reflux). A C10 fatty alcohol was obtained as a side offtake laterally at some distance above the feed inlet. The bottom essentially consisted of C12 to C16 alcohols.

TABLE 1

| Time | Head temperature [° C.] | Head pressure [mbar] | Distillate withdrawal rate [kg/h] | Head C8 concentration [% by weight] | Side C10 concentration [% by weight] |
|---|---|---|---|---|---|
| 7.16 | 105 | 30 | 4400 | 99.16 | |
| 7.26 | 105 | 50 | 5150 | ca. 99 | 92 |
| 7.36 | 114 | 50 | 3300 | ca. 99 | |
| 7.41 | 114 | 50 | 4400 | 99.21 | 97.58 |

TABLE 2

| Time | Head temperature [° C.] | Head pressure [mbar] | Distillate withdrawal rate [kg/h] | Head C8 concentration [% by weight] | Side C10 concentration [% by weight] |
|---|---|---|---|---|---|
| 11.50 | 119 | 65 | 4600 | 98.3 | 95.9 |
| 11.55 | 111 | 30 | 4600 | | |
| 12.00 | 110 | 30 | 0 | | |
| 12.05 | 109 | 30 | 0 | 99.2 | 90.6 |
| 12.10 | 107 | 30 | 1800 | | |
| 12.15 | 106 | 30 | 3600 | | |
| 12.20 | 105 | 30 | 4600 | | 84.24 |
| 12.30 | 105 | 30 | 4600 | 99.2 | 91.9 |
| 12.54 | 105 | 30 | 4600 | | 94.88 |

Legend for Table 1

For testing the method according to the invention, the reduced pressure was uniformly increased from 30 mbar to 50 mbar, i.e., the vacuum deteriorated, at 7.26 a.m. At the same time, the distillate withdrawal rate was increased by up to 750 kg/h. The temperature rose by about 0.5 degrees Celsius per 1 mbar of pressure change. After the boiling temperature, i.e., 114° C., was reached, the distillate withdrawal rate was again reduced by 1800 kg/h. This was necessary because the distillate withdrawal rate had been increased a little too much, so that the control was overmodulated. Finally, the distillate withdrawal rate was controlled back to the old value of 4400 kg/h, and the desired head setpoint concentration of the C8 fatty alcohol of about 99% was again obtained. The temperature then remained at the increased level of 114° C.

Legend for Table 2

In this case, the reduced pressure of 65 mbar was reduced to 30 mbar, i.e., the vacuum was significantly improved. For compensation, the distillate withdrawal rate was set to zero, i.e., the reflux ratio was increased to 100%. Then, the distillate withdrawal rate was again increased incrementally to the setpoint of 4600 kg/h, and the desired head setpoint concentration of about 99% C8 fatty alcohol and a corresponding desired setpoint concentration of about 95% C10 fatty alcohol at the side offtake were again obtained. After this transition period, the temperature had leveled off at 105° C. The entire transition lasted for only about half an hour.

In the Tables, the concentration has not been stated for every time because the samples were taken and examined (by means of a gas chromatograph) only about every 15 to 20 minutes. These experiments demonstrate illustratively that when there is a change in the vacuum, only a very short period is required to obtain a new stable steady state condition with the desired concentrations of the products at the head and side offtake.

The control according to the invention is also applicable for controlling the bottom temperature or the reflux ratio resulting from the changes in energy input.

The control concept according to the invention has the following advantages: A self-controlling distillation plant is possible. An improvement of the quality of the overhead distillate by a direct response of the control to changes in pressure and temperature in the overhead region is achieved. The control principle has a balancing effect on changes in the raw material composition. On-line analytics can be dispensed with. Visual and/or acoustic monitoring can be effected by limit monitors when the calculated boiling or condensation temperatures are exceeded or fallen short of.

3RD EXAMPLE

Figure 4:
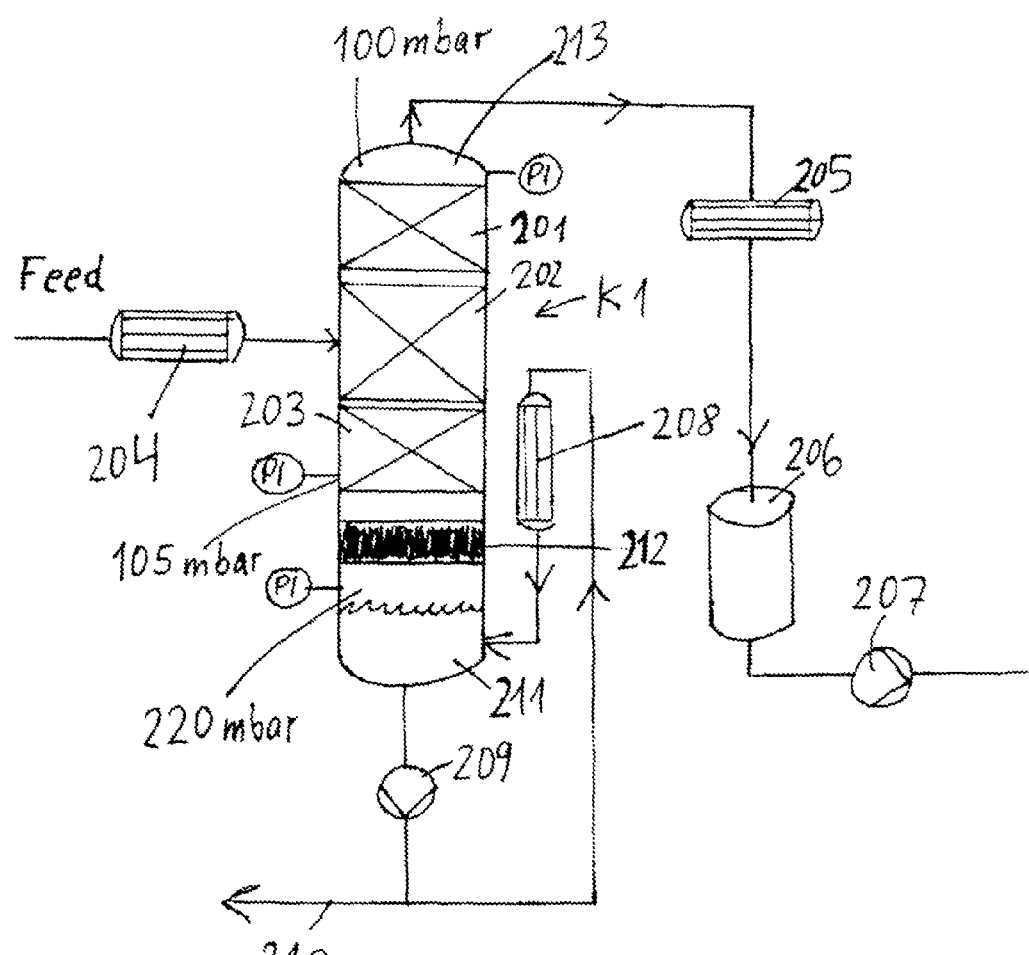
FIG. 4 shows a flow diagram of a plant for performing the method according to the invention according to a third Example.

FIG. 4 shows the flow diagram of a possible plant for performing the process according to the invention according to a third Example. The column K1 contains packings 201, 202, 203, which cause a pressure loss of 8 mbar for all three packings when the column is operated in the usual way. In column K1 and the downstream column K2 (see FIG. 5), a fatty alcohol mixture with C6 to C18 carbon chain lengths is processed by distillation. The feed is fed laterally into the column K1 through a feed heater 204 (FIG. 4). The overhead product consisting of a fatty alcohol mixture having C6 to C10 chain lengths is withdrawn through a condenser 205 and a distillate receiver 206 by means of a pump 207. Further shown are a bottom heater 208 and a pump 209 by means of which the bottom is pumped off and either recirculated through the bottom heater 208 or fed through conduit 210 into the bottom region of column K2 (see FIG. 5).

According to the invention, a throttle element 212 is provided between the bottom 211 and the lowermost packing 203, causing a pressure loss that is higher than the overall pressure loss of packings 201, 202, 203. This throttle element can have different technical designs. It may be, for example, a bubble cap plate, perforated plate or a packing according to the prior art, but modified according to the invention in such a way that said plate or packing causes the desired pressure loss. Due to the throttle element 212, the pressure above the bottom 211 is 220 mbar, although a pressure of only 105 mbar can be established above the throttle element 212. The position where the throttle element is built in depends on the distillate load of the column, and in FIG. 4, the position is chosen for a low proportion of distillate.

Figure 5:
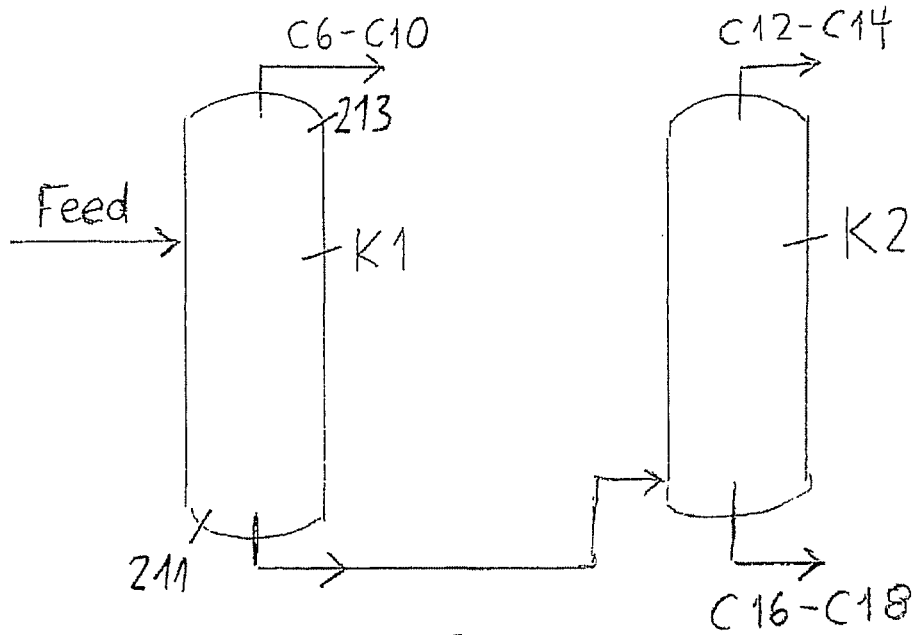
FIG. 5 shows a flow diagram of a plant with which the experiment according to the invention and in accordance with the third Example as described in the following was run.
Figure 6:
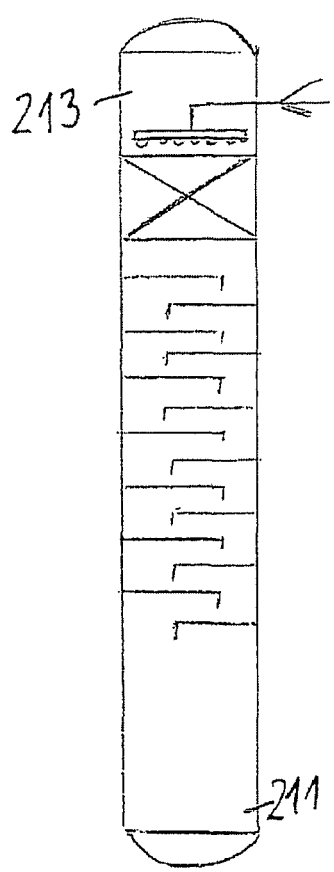
FIG. 6 shows the construction of columns K1 and K2 in FIG. 5 in a schematic sectional representation.

An operational experiment was performed with the plant according to FIG. 5 and FIG. 6 having a higher distillate load of 15% proportion of distillate. FIG. 6 shows details of the columns K1 and K2 in FIG. 5.

Columns K1 and K2 contain 14 trays, which are numbered from top to bottom. The first to fourth trays each are perforated plates. The fifth to fourteenth plates are designed as bubble cap plates.

In operation without the throttle element according to the invention in column K1, a pressure loss of 46 mbar was measured between the head 213 and bottom 211. The temperature in the bottom 211 was 198° C.

An operational experiment with an additional flow resistance, i.e., a throttle element, in the region of the 4th to 8th trays, again counted from the top, yielded the following results:

The pressure loss between the head and bottom was now 100 mbar, and the bottom temperature was measured to be 207° C. Surprisingly, the energy consumption, i.e., the consumption of hot vapor, was reduced by about 20% in the first column K1 and also by about 20% in the second column K2. The latter fact is all the more astonishing since column K2 had not been changed in this experiment and, in particular, did not contain any additional throttle element, either. An explanation for this could be that the increased bottom temperature in column K1 has the effect that a hotter product is fed to column K2, which in turn causes a higher preliminary separation there.

The quality of the fatty alcohol products obtained was about the same as before the throttle element was built in, the term "quality" meaning the purity of the product and the absence of the undesirable components.

| List of reference symbols | |
|---|---|
| 1 | Distillation column |
| 2 | Heat exchanger |
| 3 | After-condenser |
| 4 | Vacuum aggregate |

| List of reference symbols | |
|---|---|
| 5 | Cooling medium inlet |
| 6 | Cooling medium outlet |
| 7 | Inlet for feed raw material |
| 8 | Vapor inlet for bottom heater 15 |
| 9 | Condensate outlet for bottom heater 15 |
| 10 | Distillate reflux conduit |
| 11 | Distillate receiver |
| 12 | Control means |
| 13 | Conduit |
| 14 | Three-way valve |
| 15 | Bottom heater |
| 16 | Bottom outlet |
| 17 | Head condenser 1 |
| 18 | Head condenser 2 |
| 19 | Reflux conduit |
| 20 | Reflux condenser |
| 21 | Reflux manifold |
| 22 | Reflux manifold |
| 101 | Distillation column |
| 102 | Conduit |
| 103 | Condenser |
| 104 | Conduit |
| 105 | Distillate receiver |
| 106 | Distillate pump |
| 107 | Valve |
| 108 | Reflux conduit |
| 109 | Valve |
| 110 | Vacuum aggregate |
| 111 | Valve |
| 112 | Control means |
| 113 | Temperature measuring point |
| 114 | Temperature measuring point |
| 115 | Pressure measuring point |
| 116 | Condenser |
| 117 | Conduit |
| 118 | Condenser |
| 119 | Temperature measuring point |
| 120 | Pressure measuring point |
| 121 | Valve |
| 122 | Flow meter |
| K1 | First column |
| K2 | Second column |
| 201 | Packing |
| 202 | Packing |
| 203 | Packing |
| 204 | Feed heater |
| 205 | Condenser |
| 206 | Distillate receiver |
| 207 | Pump |
| 208 | Bottom heater |
| 209 | Pump |
| 210 | Conduit |
| 211 | Bottom |
| 212 | Throttle element |
| 213 | Head |

The invention claimed is:

1. A method for manually or automatically controlling at least one of composition and quality of one or more products withdrawn from the top, bottom or side offtake of a distillation column with a built-in heat exchanger, wherein when the pressure in the column is changed in the region of product withdrawal, then the new boiling temperature of the product at this pressure is determined from the vapor-pressure curve of the product, and the temperature of the distillate withdrawal is set at this new boiling temperature, comprising:
installing the heat exchanger in the distillation column; and
setting the temperature of the distillate withdrawal at the new boiling temperature by means of a changed flow of a cooling medium through the heat exchangers, until the temperature in the column in the region of product withdrawal has reached the new setpoint as determined from the vapor-pressure curve, wherein the cooling medium outer is in the bottom of the distillation column, or the cooling medium is conducted through a bottom medium.

2. The method according to claim 1, wherein it is applied to the distillation of non-azeotropic mixtures, of an alcohol mixture, of propanediol or for the purification of water from industrial water or sea water.

3. The method according to claim 1, further comprising:
ensuring heat recovery without condensation point control by flowing the distillate exhaust vapors past a plurality of cooling tubes of the heat exchanger in countercurrent.

4. The method according to claim 1, further comprising:
performing the distillation under an increased pressure.

5. The method according to claim 1, further comprising:
effecting the control by changing a quantity withdrawn or a reflux as a function of a thermodynamic state variable;
when the pressure in the column is changed in the region of product withdrawal, temperature change required therefrom from the vapor pressure curve of the product;
changing at least one of a reflux and distillate withdrawal rate on a short term basis until the temperature in the column in the region of product withdrawal has reached the new setpoint as determined from the vapor-pressure curve; and
resetting at least one of the reflux and distillate withdrawal rate to the original value.

6. The method according to claim 5, further comprising:
additionally monitoring the temperature at a site other than the product withdrawal; and
using the measured values obtained for control.

7. The method according to claim 5, further comprising:
during transition from one steady state condition to another, detecting by means of limit monitors any exceeding or falling short of the setpoint temperature as determined from the vapor pressure curve of the product, and
emitting at least one of an optical and acoustic signal.

8. The method according to claim 1, further comprising:
providing built-in features, structured or unstructured packings, packing bodies or trays or the like, with a specified pressure loss for predefined liquid and vapor loads of the column, and
providing a throttle element above the bottom, especially below the built-in features of a feed inlet, the throttle element having such a design that the highest pressure loss will occur at this throttle element, wherein the pressure loss at the throttle element is higher than the total pressure loss over the remaining built-in features.

9. The method according to claim 8, wherein the pressure loss over the throttle element is higher than the total pressure loss of the entire column without taking the pressure loss over the so-called throttle element into account.

10. The method according to claim 9, further comprising:
supplying a feed laterally between the throttle element and the head or bottom, wherein the feed temperature is higher than the boiling temperature of the highest-boiling component of the desired overhead product at a pressure corresponding to the pressure in the feed inlet of the column and lower than the boiling temperature of the lowest-boiling component of the desired bottom product at a pressure corresponding to the pressure in the bottom region.

11. The method according to claim 8, wherein the bottom temperature is lower than the boiling temperature of the lowest boiling component of the desired bottom product as measured above the throttle element taking the pressure prevailing there into account and higher than the boiling temperature of the highest boiling component of the desired overhead product, each at a pressure corresponding to the pressure in the bottom region.

12. The method according to claim 8, further comprising:
selecting or reducing the height of the column in such a way that the overhead product remains gaseous/vaporous within the column and does not condense within the column.

* * * * *